United States Patent [19]
Shimotsu

[11] Patent Number: 5,564,934
[45] Date of Patent: Oct. 15, 1996

[54] CONNECTOR

[75] Inventor: Akihiro Shimotsu, Tokyo, Japan

[73] Assignee: Hirose Electric Co., Ltd., Tokyo, Japan

[21] Appl. No.: 356,655

[22] Filed: Dec. 15, 1994

[30] Foreign Application Priority Data

Feb. 1, 1994 [JP] Japan ................................ 6-010380

[51] Int. Cl.⁶ .................................................. H01R 13/44
[52] U.S. Cl. ........................................... 439/139; 439/143
[58] Field of Search .................................. 439/135–139, 439/143, 924

[56] References Cited

U.S. PATENT DOCUMENTS

| 4,339,165 | 7/1982 | Malsot et al. | 439/139 |
| 5,234,350 | 8/1993 | Marechal et al. | 439/139 |
| 5,267,870 | 12/1993 | Maresh | 439/139 |

FOREIGN PATENT DOCUMENTS

| 0570652 | 11/1993 | European Pat. Off. | |
| 2533711 | 3/1984 | France. | |
| 2579027 | 9/1986 | France | 439/139 |
| 3312943 | 10/1984 | Germany. | |
| 0680312 | 7/1992 | Switzerland. | |

Primary Examiner—P. Austin Bradley
Assistant Examiner—Jill DeMello
Attorney, Agent, or Firm—Kanesaka & Takeuchi

[57] ABSTRACT

A connector consists of a connector plug (100) and a connector jack (200). The connector plug includes a plug shell (130) provided in front of a plug body (120) and having a shell aperture (131); a plug shutter (140) provided in front of the plug shell and having a plug shutter aperture (141); and a return spring (160) for biasing the plug shutter with respect to the plug shell so that the plug shutter aperture is offset from the shell aperture to thereby close the shell aperture with the plug shutter. The connector jack includes a jack shutter (230) provided in front of the jack block (220) and having a jack shutter aperture (231); and a return spring (240) for biasing the jack shutter with respect to the jack block so that the jack shutter aperture is offset from the jack terminal aperture to thereby close the jack terminal aperture with the jack shutter. A moving device (114, 233A, 311, 433) is provided on the connector plug and jack for moving, upon plugging the connector plug into the connector jack, the plug shutter with respect to the plug shell so as to align the plug shutter aperture with the shell aperture while moving the jack shutter with respect to the jack block so as to align the jack shutter aperture with the jack terminal aperture so that the plug terminal passes through these aligned apertures and comes into contact with the jack terminal.

9 Claims, 5 Drawing Sheets

CONNECTOR

BACKGROUND OF THE INVENTION

1. Field of the Invention

The present invention relates to connectors for use in electrical and/or optical fields.

2. Description of the Related Art

Electrical or optical connectors generally consist of a plug and a jack. Under unplugged conditions, the terminals, such as electrical contacts, or optical contacts and ferrules, of these plugs and jacks are exposed to the atmosphere. As a result, dust and dirt deposit on these terminals, causing poor contact under plugged conditions. The electrical contacts can cause an electrical shock upon accidental contact.

For these reasons, connectors with a cap covering the plugging opening under unplugged conditions have been used. These caps, however, are frequently not used, or fall off, or are unwanted because handling them is troublesome.

Japanese patent apportion Kokai Nos. 2-7376 (hereinafter "JP'376") and 4-181666 (hereinafter "JP'666") disclose connectors with a shutter which is automatically opened upon plugging. That is, JP'376 discloses a connector with a dust-proof shutter, which includes a rotary shutter provided on the opening of a male connector for closing the opening when the male connector is not plugged in a female connector. Upon plugging, the shutter is automatically turned open so that the contact elements of the connectors can contact with each other.

JP'666 discloses a shutter plate provided on the opening of a male connector for closing the opening when the male connector is not plugged in a female connector. Upon plugging, the shutter plate is automatically opened so that the contact elements of the connectors can contact each other.

In the above connectors, however, the female connectors have no shutter so that dust and dirt tend to deposit on the contact elements of the female connectors.

In addition, the rotary shutters or shutter plates of the male connectors can be opened by a push with a finger or the like so that there is a danger that a finger or the like can accidentally contact a contact element, thus receiving an electric shock.

SUMMARY OF THE INVENTION

Accordingly, it is an object of the invention to provide a connector for use in an electrical or optical field without the aforementioned disadvantages.

According to the invention there is provided a connector consisting of a connector plug and a connector jack, the connector plug including a plug body; a plug terminal extending forwardly from the plug body; a plug shell provided in front of the plug body and having a shell aperture for allowing the plug terminal to pass therethrough; a plug shutter provided in front of the plug shell and having a plug shutter aperture for allowing the plug terminal to pass therethrough; and a return spring for biasing the plug shutter with respect to the plug shell so that the plug shutter aperture is offset from the shell aperture to thereby close the shell aperture with the plug shutter under unplugged conditions, and the connector jack including a jack block having a terminal aperture; a jack terminal provided in the terminal aperture; a jack shutter provided in front of the jack block and having a jack shutter aperture for allowing the plug terminal to pass therethrough; and a return spring for biasing the jack shutter with respect to the jack block so that the jack shutter aperture is offset from the jack terminal aperture to thereby close the jack terminal aperture with the jack shutter under unplugged conditions, and a moving device provided on the connector plug and jack for moving, upon plugging the connector plug into the connector jack, the plug shutter with respect to the plug shell so as to align the plug shutter aperture with the shell aperture while moving the jack shutter with respect to the jack block so as to align the jack shutter aperture with the jack terminal aperture so that the plug terminal passes through these aligned apertures and comes into contact with the jack terminal.

The above and other objects, features, and advantages of the invention will be more apparent from the following description when taken in conjunction with the accompanying drawings.

DESCRIPTION OF THE PREFERRED EMBODIMENTS

Figure 1:
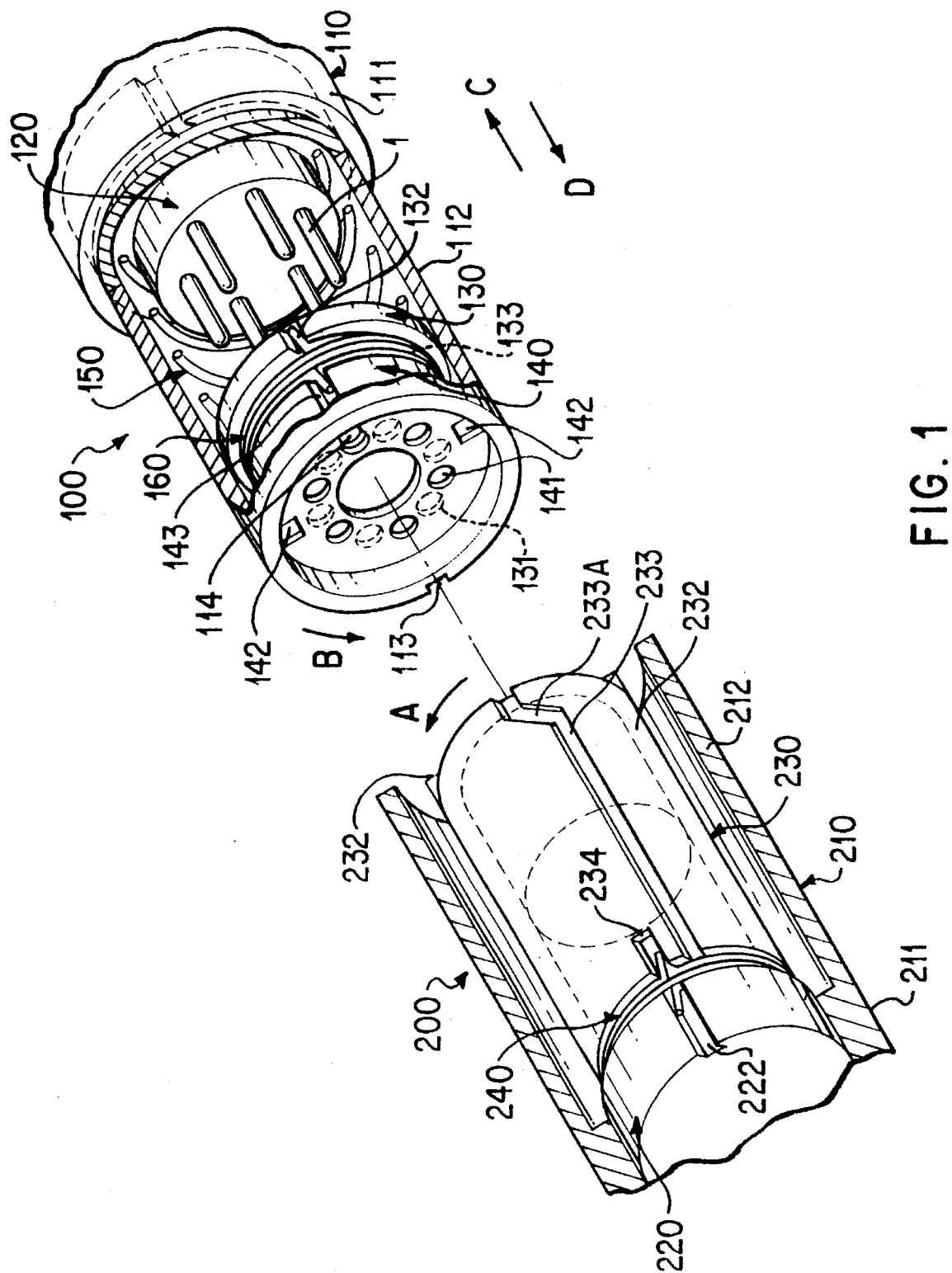
FIG. 1 is an upper left perspective view of plugging portions of a plug and a jack according to an embodiment of the invention.
Figure 2:
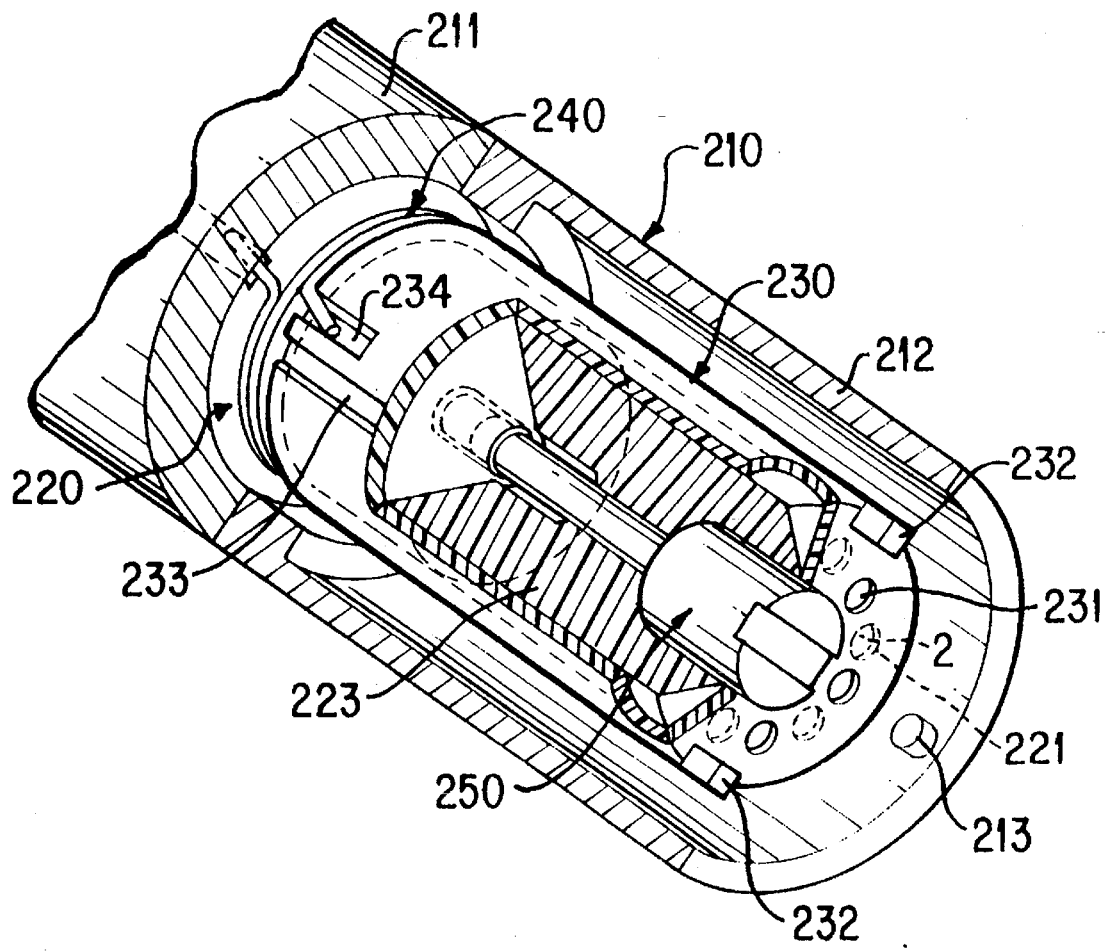
FIG. 2 is an upper right perspective view of the plugging portion of the jack.

In FIGS. 1 and 2, a connector plug 100 includes a plug body 120, six plug terminals 1, such as male electrical contact elements or optical ferrules, extending forwardly from the plug body 120, a plug shell 130 having six shell apertures 131 through which the plug terminals 1 can pass, and a plug shutter 140 having six plug shutter apertures 141 through which the plug terminals 1 can pass.

A connector jack 200 includes a jack body 220, a jack block 223 having six terminal apertures 221 in which jack terminals 2, such as female electrical contact elements or optical ferrules, are disposed, and a jack shutter 230 having six jack shutter apertures 231 through which the plug terminals 1 can pass.

The connector plug 100 includes a cylindrical plug jacket 110 for covering the plug body 120, the plug shell 130, and the plug shutter 140. The plug jacket 110 has a rear section 111 for covering the base portion of the plug body 120 and a front section 112 extending forwardly from the rear section 111 to cover the plug shell 130 and the plug shutter 140. The front section 112 is provided with a guide channel 113 on the forward outer surface thereof and a plug projection 114 on the forward inner surface thereof.

Figure 3:
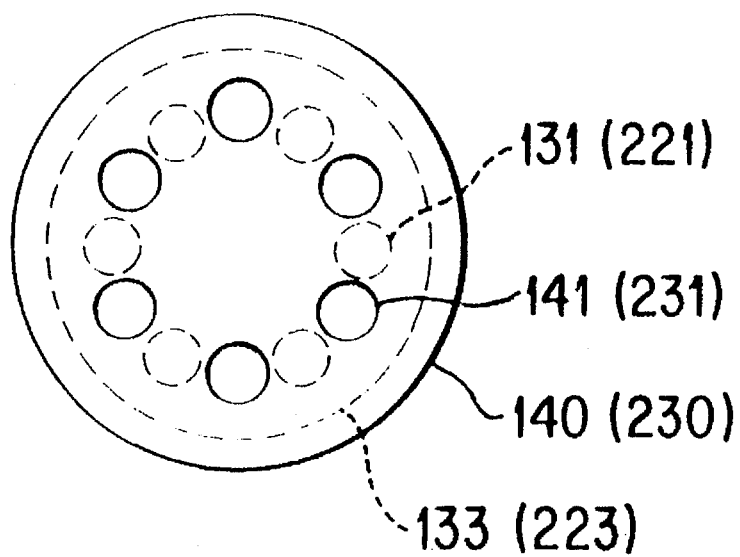
FIGS. 3 and 4 are front views of the plug (jack) showing the operation of a shutter.

The plug shutter 140 is rotatable around the reduced front portion 133 of the plug shell 130. A return coil spring 160 is provided between the plug shutter 140 and the plug shell 130. One end of the return spring 160 is fixed to a stop notch 132 of the plug shell 130 while the other end is fixed to a stop notch 143 of the plug shutter 140. When the connector plug 100 and connector jack 200 are not plugged together, the return spring 160 biases the plug shutter 140 with respect to the plug shell 130 so that the shutter apertures 141 are offset from the shell apertures 131 to thereby close the shell apertures 131 with the plug shutter 140 as shown in FIG. 3.

A pair of shutter notches 142 are provided on the periphery of the plug shutter 140. A coil spring 150 is provided between the plug body 120 and the plug shell 130 for biasing the plug shell 130 and the plug shutter 140 with respect to the plug body 120 so that the shutter apertures 141 are away from the plug terminals 1 when the connector plug 100 and the connector jack 200 are not plugged together.

The connector jack 200 has a cylindrical jack jacket 210 for covering the jack body 220, the jack block 233, and the jack shutter 230. The jack jacket 210 has a rear section 211 for covering the jack body 220 and a front section 212 extending forwardly from the rear section 211 to cover the jack block 223 and the jack shutter 230. As best shown in FIG. 2, a jack projection 213 is provided on the forward inner surface of the front section 212.

The jack shutter 230 is rotatable around the jack block 223. A return coil spring 240 is provided between the jack shutter 230 and the jack block 223. One end of the return spring 240 is fixed to a stop notch 222 of the jack body 220 while the other end is fixed to a stop notch 234 of the jack shutter 230. The return spring 240 biases the jack shutter 230 with respect to the jack body 220 so that the shutter apertures 231 are offset from the terminal apertures 221 to thereby close the terminal apertures 221 with the jack shutter 230 as shown in FIG. 3.

As best shown in FIG. 2, a pair of shutter projections 232 are provided on the forward periphery of the jack shutter 230. As best shown in FIG. 1, a shutter guide channel 233 with a tapered portion 233A is provided on the outer surface of the jack shutter 230.

The jack block 223 and the jack shutter 230 are detachable from the jack body 220 so that the jack terminals 2 disposed within the terminal apertures 221 of the jack block 223 can be cleaned. The plug terminals 1 can be exposed so that there is no need for such a structure.

More specifically, the jack block 223 and the jack shutter 230 are integrated as a unit with an appropriate means, such as engaging outer and inner circumferential grooves, so that the jack shutter 230 can turn around the jack block 223 but is fixed in the axial direction. As best shown in FIG. 2, the jack block 223 and jack shutter 230 unit is attached to the jack body 220 for rotation with a fixing screw 250 which passes through the central through-hole of the unit.

To remove the jack block 223 and jack shutter 230 unit, it is only necessary to lose the fixing screw 250 so that the fixing screw 250 disengages from the thread of the jack body 220. The fixing screw 250 is incorporated in the central through-hole of the jack block 223 such that it cannot removed from the jack block 223 without destroying the thread. Consequently, by pulling the fixing screw 250 from the jack jacket 210, it is possible to remove the jack block 223 and jack shutter 230 unit.

The connector plug 100 and the connector jack 200 are plugged together as follows: The jack projection 213 of the connector jack 200 is inserted into the guide channel 113 of the connector plug 100 while the plug projection 114 is inserted into the guide channel 233 of the jack shutter 230 such that the shutter projections 232 are inserted into the shutter notches 142. When the connector plug 100 is pushed into the connector jack 200 under these conditions, the plug projection 114 strikes the tapered portion 233A of the guide channel 233 so that the jack shutter 230 is turned in the direction of an arrow A against the spring 340, which turns the plug shutter 140 in the direction of an arrow B against the spring 160 because the shutter projections 232 have engaged the shutter notches 142. At this point, the plug shutter 140, the return spring 160, and the plug shell 130 are moved in the direction of an arrow C against the coil spring 150.

Figure 4:
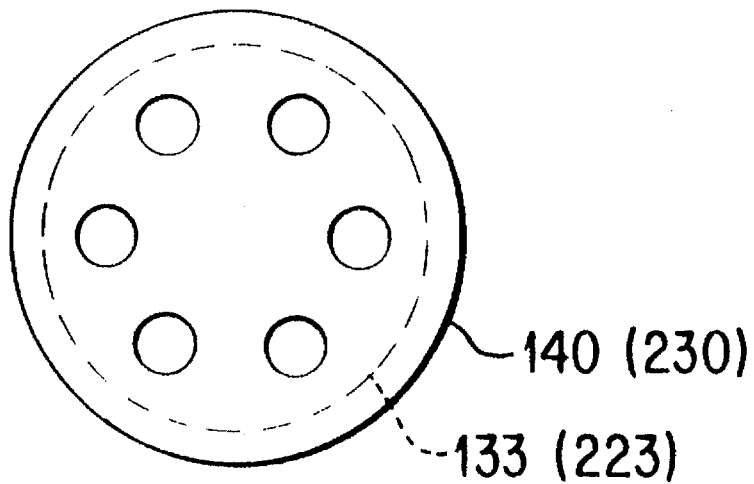

When the plug projection 114 reaches the straight section of the guide channel 233, the jack terminal apertures 221 are aligned with the jack shutter apertures 231 of the jack shutter 230 while the plug shell apertures 131 of the plug shell 130 are aligned with the shutter apertures 141 of the plug shutter 140 as shown in FIG. 4. Now, it is ready to bring the plug terminals 1 into contact with the jack terminals 2.

When the connector plug 100 is further inserted into the connector jack 200, the plug shell 130 and the plug shutter 140 are moved rearwardly against the coil spring 150 so that the plug terminals 1 project through the corresponding shutter apertures 141 of the plug shutter 140 and the corresponding shutter apertures 231 of the jack shutter 230 and contact the corresponding jack terminals 2 of the jack block 223.

The connector plug 100 and the connector jack 200 are disconnected as follows: As the connector plug 100 is pulled out of the connector jack 200, the coil spring 150 moves the plug shell 130 and the plug shutter 140 in the direction of an arrow D. When the plug terminals 1 leave the shutter apertures 141, and the plug projection 114 leaves the tapered portion 233A, the jack shutter 230 and the plug shutter 140 are returned to and held in the original positions by the return springs 240 and 160, respectively. Under these unplugged conditions, the shell apertures 131 and the jack terminal apertures 221 are closed by the plug shutter 140 and the jack shutter 230, respectively.

Figure 5:
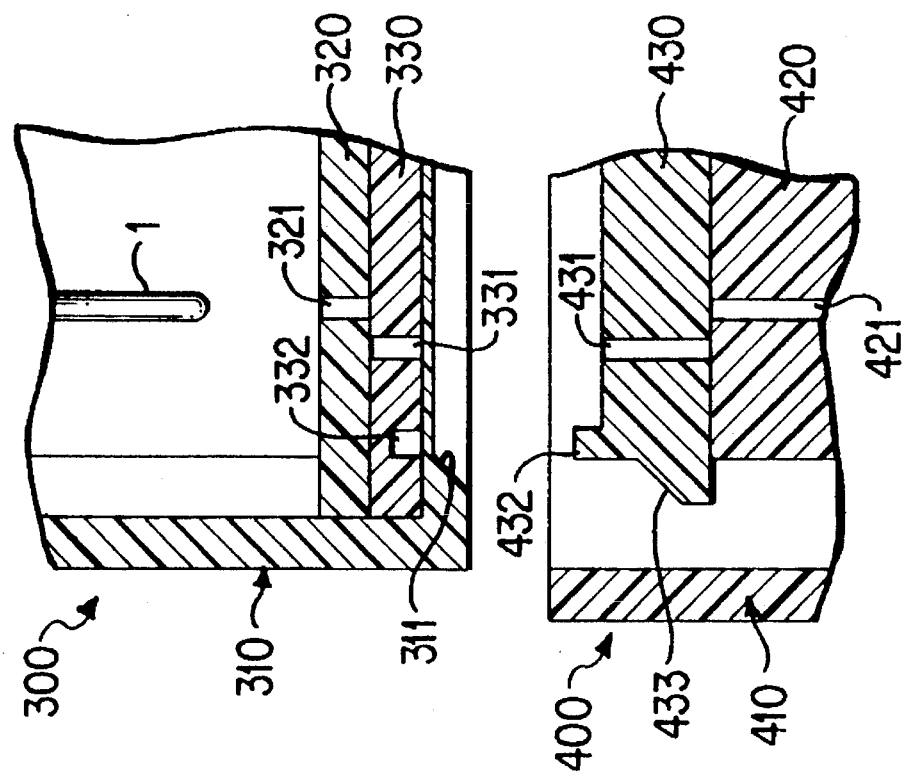
FIG. 5 is a sectional view of part of connectors according to another embodiment of the invention.
Figure 7:
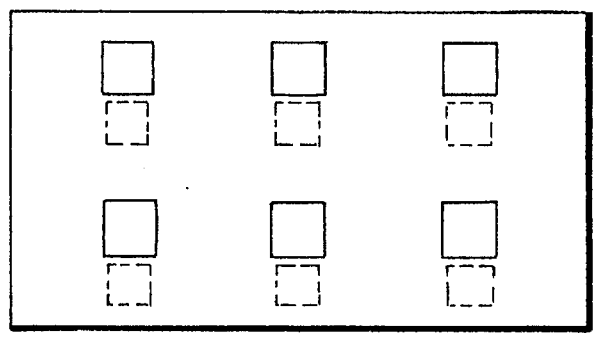
FIGS. 7 and 8 are front views of parallel type shutters showing shutter apertures offset from terminal apertures.
Figure 8:
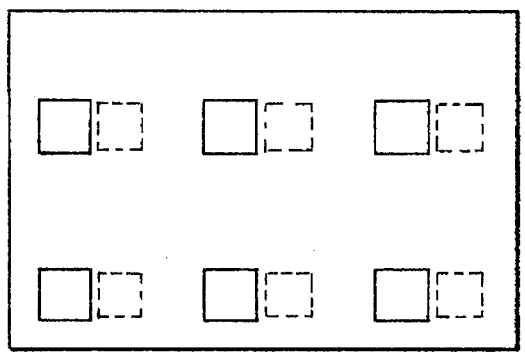
Figure 9:
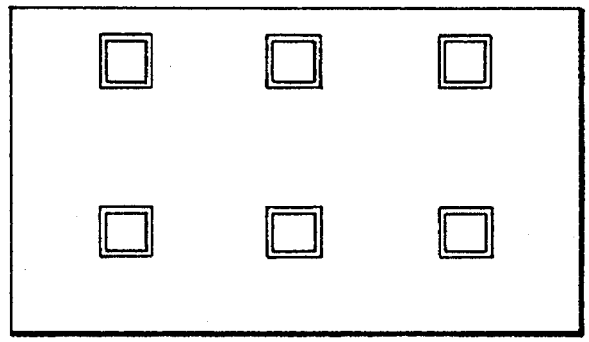
FIG. 9 is a front view of the parallel shutter with the shutter apertures aligned with the terminal apertures.

In FIG. 5, a connector plug 300 includes a plug jacket 310 having a tapered plugging mouth 311, a plug shell 320 having six plug terminal apertures 321 provided in alignment with six plug terminals 1, and a plug shutter 330 having six plug shutter apertures 331 provided in at positions offset from the terminal apertures 321 and a guide notch 332 provided outside the shutter apertures 331. A connector jack 400 includes a jack jacket 410 and a jack block 420 provided within the jack jacket 410. The jack block 420 has six jack terminal apertures 421 for jack terminals. A jack shutter 430 has six jack shutter apertures 431 offset from the jack terminal apertures 421 of the jack block 420. The jack shutter 430 is provided with a tapered circumferential surface 433 and a guide projection 432 on the tapered circumferential surface 433.

Figure 6:
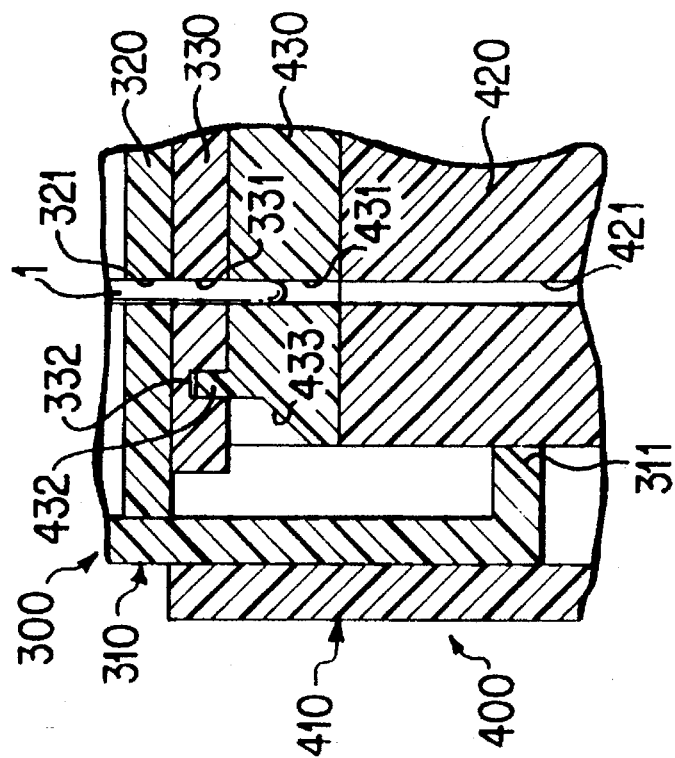
FIG. 6 is a sectional view of the connector of FIG. 5 showing a plugging condition.

The connector plug 300 and the connector jack 400 are plugged together as follows: The plug jacket 310 is inserted into the jack jacket 410 such that the guide projection 432 engages the guide notch 332. When the connector plug 300 is further inserted, the tapered mouth 311 contacts the tapered circumferential surface 433. When the connector plug 300 is further pushed, the jack shutter 430 is moved laterally to the right, which moves the plug shutter 330 to the right because the guide projection 432 has engaged the guide notch 332. At the same time, the plug shutter 330 and the plug shell 320 are moved toward the plug terminals 1. When the connector plug 300 is further pushed, the plug terminals 1 project through the terminal apertures 321 and the plug shutter apertures 331 into the jack shutter apertures 431 as shown in FIG. 6. and then terminal apertures 421 for contact with the jack terminals.

Like the embodiment of FIGS. 1–3, a coil spring is provided for biasing the plug shutter 330 and the plug shell 320 toward the plugging mouth 311, and return springs, such as leaf springs or rubber bands, for biasing the plug shutter 330 and the jack shutter 430, respectively, to the left. As a result, simply pulling the connector plug 300 from the connector jack 400 brings the connectors into unplugged conditions wherein the respective shutters 330 and 430 close all of the apertures 321 and 421.

Alternatively, the tapered portions for sliding the shutters may be replaced a combination of a guide pin and a tapered oval hole. The coil and leaf springs may be replaced with a variety of elastic materials.

The structures of the connector plug and jack described above are applicable to both of the electrical and optical connectors. The connector plug and jacket may be single core type connector plug and jacket wherein the number of terminals is one.

As has been described above, under the unplugged condition, the terminal apertures are closed by the shutters so as to provide completely dust proof effects.

Plugging the connector plug to the connector jack automatically moves the shutter so as to eliminate the troublesome operation.

Unless the connector plug is plugged into the connector jacket, the terminal apertures are closed so as to maximize the dust proof effects.

The shutters cannot be opened accidentally under the unplugged condition, there is no accidental electric shock.

The jack block and jack shutter are detachable so that it is easy to clean the jack terminals.

The invention claimed is:

1. A connector comprising:
   a connector plug; and
   a connector jack to be plugged to said connector plug:
   said connector plug comprising:
      a plug body;
      at least one plug terminal extending forwardly from said plug body;
      a plug shell provided in front of said plug body and having at least one shell aperture for allowing said plug terminal to pass therethrough;
      a plug shutter provided in front of said plug shell and having at least one plug shutter aperture for allowing said plug terminal to pass therethrough; and
      first means for biasing said plug shutter with respect to said plug shell so that said plug shutter aperture is offset from said shell aperture to thereby close said shell aperture with said plug shutter when said connector plug is not connected to said connector jack; and
   said connector jack comprising:
      a jack block having at least one terminal aperture;
      at least one jack terminal provided in said terminal aperture;
      a jack shutter provided in front of said jack block and having at least one jack shutter aperture for allowing said plug terminal to pass therethrough; and
      second bias means for biasing said jack shutter with respect to said jack block so that said jack shutter aperture is offset from said jack terminal aperture to thereby close said jack terminal aperture with said jack shutter when said connector jack is not plugged to said connector plug; and
      moving means provided on said connector plug and jack for moving, upon plugging said connector plug into said connector jack, said plug shutter with respect to said plug shell so as to align said plug shutter aperture with said shell aperture while moving said jack shutter with respect to said jack block so as to align said jack shutter aperture with said jack terminal aperture so that said plug terminal passes through these aligned apertures and comes into contact with said jack terminal.

2. A connector according to claim 1, wherein said first bias means provided between said plug shell and said plug shutter while said second bias means between said jack block and said jack shutter.

3. A connector according to claim 1, which further comprising third biasing means provided between said plug shell and said plug body for biasing said plug shell and shutter with respect to said plug body so as to move said plug shutter aperture away from said plug terminal.

4. A connector plug to be plugged into a connector jack, the jack comprising a jack block with at least one terminal aperture, at least one jack terminal provided in said terminal aperture, and a jack shutter having at least one jack shutter aperture, said connector plug comprising:
   a plug body;
   at least one plug terminal extending forwardly from said plug body;
   a plug shell provided in front of said plug body and having at least one shell aperture for allowing said plug terminal to pass therethrough;
   a plug shutter provided in front of said plug shell and having at least one plug shutter aperture for allowing said plug terminal to pass therethrough;
   biasing means for biasing said plug shutter with respect to said plug shell so as to offset said shutter aperture from said shell aperture when said connector plug is not plugged to said connector jack; and
   moving means provided on said connector plug and jack for moving upon plugging said plug shutter with respect to said plug shell so as to align said shutter aperture with said shell aperture while moving said jack shutter with respect to said jack block so as to align said jack shutter aperture with said jack terminal aperture so that said plug terminal passes through theses aligned apertures into contact with said jack terminal.

5. A connector plug according to claim 4, wherein said biasing means is provided between said plug shell and said plug shutter.

6. A connector plug according to claim 4, which further comprises second biasing means provided between said plug shell and said plug shutter for biasing said plug shell and said plug shutter with respect to said plug body so as to bring said plug shutter aperture to a position away from said plug terminal.

7. A connector jack for receiving a connector plug, the plug comprising a plug body, at least one plug terminal extending forwardly from said plug body, a plug shell provided in front of said plug body and having at least one plug shell aperture for allowing said plug terminal to pass therethrough, and a plug shutter provided in front of said plug shell and having at least one plug shutter aperture for allowing said plug terminal to pass therethrough, said connector jack comprising:
   a jack block with a terminal aperture;
   at least one jack terminal provided in said terminal aperture;
   a jack shutter provided in front of said jack block and having at least one jack shutter aperture for allowing said plug terminal to pass therethrough;

biasing means for biasing said jack shutter with respect to said jack block so as to offset said jack shutter aperture from said jack terminal aperture when said connector jack is not plugged to said connector plug; and moving means provided on said connector plug and jack for moving said plug shutter with respect to plug shell so as to align said plug shutter aperture with said shell aperture while moving said jack shutter with respect to said jack body so as to align said jack shutter aperture with said jack terminal aperture so that said plug terminal passes through theses aligned apertures into contact with said jack terminal.

8. A connector according to claim 7, wherein said biasing means is provided between said jack block and said jack shutter.

9. A connector according to claim 7, wherein said jack block and said jack shutter are detachable from said jack body.

* * * * *